Feb. 25, 1964
G. A. CROWE, JR
3,122,140
FLEXIBLE ABSORBENT SHEET
Filed March 29, 1962
2 Sheets-Sheet 1
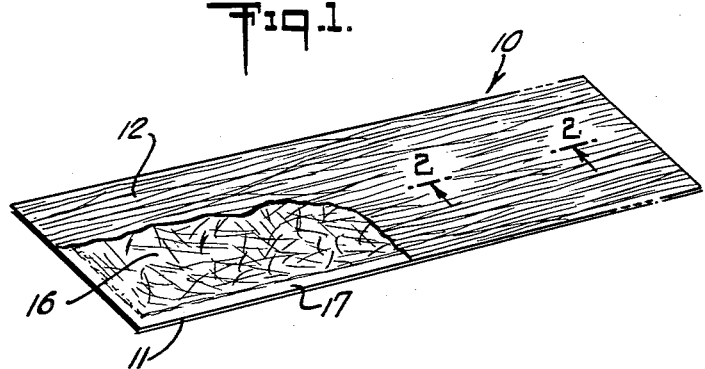
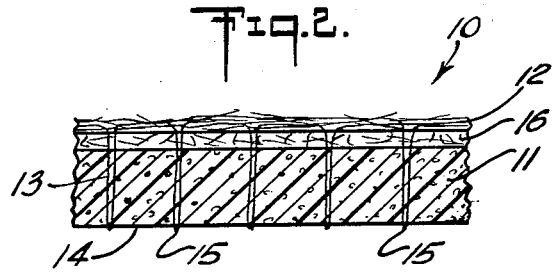
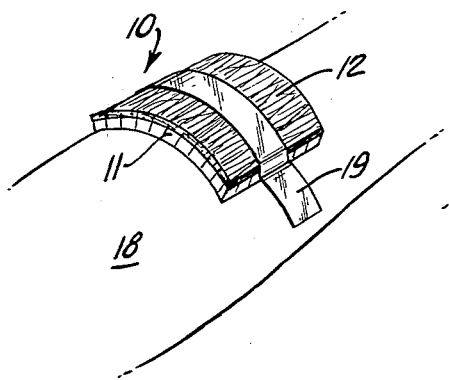
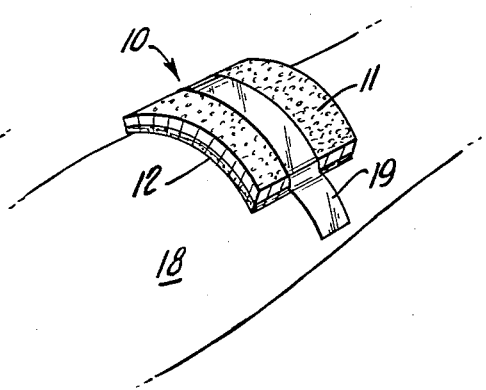
INVENTOR
GEORGE A. CROWE JR.
BY
ATTORNEY Feb. 25, 1964 G. A. CROWE, JR 3,122,140
FLEXIBLE ABSORBENT SHEET
Filed March 29, 1962 2 Sheets-Sheet 2

INVENTOR
GEORGE A. CROWE JR.
BY
ATTORNEY

United States Patent Office 3,122,140
Patented Feb. 25, 1964

3,122,140
FLEXIBLE ABSORBENT SHEET
George A. Crowe, Jr., Plainfield, N.J., assignor to Johnson & Johnson, a corporation of New Jersey
Filed Mar. 29, 1962, Ser. No. 183,483
12 Claims. (Cl. 128—296)

The present invention relates to resilient absorbent sheet materials and method of making the same.

Synthetic cellular sponge materials of varying types are presently available on the market. Many of these are quite soft and resilient and make excellent padding materials. However, many of the softer, more flexible and resilient cellular sponge materials, such, for example, as flexible and resilient sponges formed of polyurethane esters and polyurethane ethers, nylon, rubber, polyethylene, polyvinyl chloride, and other foamable synthetic materials are hydrophobic in nature and will not readily absorb fluids with which they are placed in contact. In copending application Ser. No. 159,117, filed December 13, 1961, absorbent sheet materials are described which comprise sheets of resilient, flexible hydrophobic sponge materials which contain hydrophilic fibers which are uncoated by the material of the sponge and extend from at least one surface of the sheet of cellular sponge material well down into the main body thereof. These fibers act to draw fluids from the surface of the sponge sheet into the main body thereof as hereinafter more fully described. When the fibers pass completely through the sheet of sponge material, the fibers also act to draw aqueous-base fluids completely through the sponge sheet where the fluids can then be absorbed by any absorbent surface provided on the other side.

These materials may be used for any purpose where a resilient, highly absorbent sheet material is needed. However, materials of this type are particularly useful in the preparation of surgical dressings and the like.

In the treatment of wounds, it is generally desirable to protect the wound with a protective covering that will draw wound exudate away from the wound surface and will, at the same time, form a protective cushion over the wound. Where the wound is of such nature that there is copious wound exudate, heavy gauze dressings formed of many layers of gauze are generally used in order to remove and absorb such exudate so as to keep the wound area free of the same. Resilient, flexible synthetic sponge materials of the type referred to when used to cover a wound will provide an excellent cushioning protective cover. However, such materials do not satisfactorily remove fluids from an underlying surface with which they are placed in contact and are accordingly unsuitable for use as dressing materials in place of the conventional gauze or other absorbent dressings. By providing, in the sheet of synthetic cellular sponge materials, numerous hydrophilic fibers extending from the surface of such sponge into the main body thereof, even though the sponge material itself may be highly hydrophobic, such hydrophilic fibers act to rapidly draw fluids from the surface of the sponge sheet into the cellular sponge material, much of the fluid being deposited, where the fibers are not coated with the material from which the sponge is made, in the cellular structure through which the absorbent hydrophilic fibers pass.

Short fibers, such, for example, as fibers having a length of up to about ¼ inch, are generally not used in the preparation of absorbent surgical products because of the difficulty of anchoring such fibers so that they will not become detached and lodge in an open wound. However, such short fibers, or fiber mixes containing such short fibers, are generally less expensive than those in which all the fibers are required to be over a specified length. Also, cellulosic products, such as cotton linters and wood pulp, although highly absorbent are of such short fiber length that they are not suitable for many purposes. Where the short fibers have been formed into absorbent papers, such as cellulose wadding and the like, it is still generally undesirable to have them contact an open wound. Also, such absorbent papers generally have very low tensile strength when wetted. In accordance with the present invention, use is made of such short absorbent fibers, both in the form of free fibers and in absorbent paper form. However, the fiber is so contained within the absorbent structure that it is either fully enclosed within the sponge material or between the sponge sheet and a web of longer fibers, the fibers of such web preferably having a length of about ½ inch to 3 inches. As herein used, fibers of such length and longer, including continuous filaments, are herein referred to as textile fibers, as opposed to fibers having a length of much less than about ½ inch which are generally considered too short for spinning threads or yarns from which textiles are formed.

In making the absorbent cellular sheet materials of the present invention, a layer or web of such short absorbent fibers is first placed on one surface of a sheet of cellular sponge material and a layer or web of longer hydrophilic fibers is then placed over that of the short fibers. The sheet with the two layers of fibers thereon is then needled by passing barbed needles down through the web of fibers into the sponge sheet to force a portion of the longer hydrophilic fibers through the main body of the underlying sponge. These fibers passing from the fiber layer of long fibers down through the web of short fibers and sheet sponge material not only serve to draw fluid into the sponge body, but also serve to mechanically interlock the absorbent fiber layers with the cellular sponge sheet and thus hold the fiber layers in intimate contact with each other and the adjacent cellular sponge material. Where the needled fibers pass completely through the sheet of cellular sponge material, even though the sponge material itself may be fairly strongly hydrophobic in nature, aqueous-base fluids which contact the side of the sponge sheet opposed to the side containing the fiber layer are rapidly drawn up into and through the sheet of sponge material. Some of the fluid remains in the cells in the sponge material adjacent the needled fibers passing through the same. However, most of the fluid is drawn on through the sponge and spread laterally through the absorbent layer and web of long hydrophilic fibers on the sponge surface. Where the long hydrophilic fibers pressed into the cellular sponge sheet by the needle operation pass down into the sheet but do not pass all the way through, it is found that when fluid is placed on the surface of the sponge sheet containing the web of long hydrophilic fibers, that not only do the absorbent layer of short fibers and the webs of long hydrophilic fibers act to absorb the fluid but that the fibers that penetrate down into the cellular sponge sheet carry a substantial amount of fluid down into the cells of the sponge material, thus substantially increasing the over-all absorptive capacity of the resulting product. Where the cellular sponge sheet is of hydrophobic material, the opposite side to that containing the webs of hydrophilic fibers can be wetted without any fluid passing through the product and wetting the fiber webs contained on the other side. The product thus prepared has both the advantages of a highly absorbent fabric as well as those of a water-repellent sheet.

Where it is desired that the opposite side be water-impermeable, cellular sponge material can be used in which the skin, which normally forms in making, as, for example, with urethane foam sponges, has not been removed or in which the cells on the surface are maintained quite small by forming the urethane sponge material in the manner of U.S. Patent 2,956,310. Also, if a smooth impervious surface is desired, a water-impervious plastic film may be secured to the sheet sponge surface.

For the long hydrophilic fibers, any length hydrophilic fibers, including continuous fibers, may be used, it only being necessary that the fibers be sufficiently long to be combined with the cellular sponge sheet and extend from a fiber web a substantial distance into the sponge material itself. In using the term "hydrophilic fibers," those fibers or filaments, including continuous filaments, are included which have the natural property of moving aqueous fluids along their length by capillary action, either as single fibers or as fiber bundles, as well as those fibers and filaments which, although normally not wetted by water, have been treated to make the same readily wettable so that they will move aqueous fluids along their surface. It is generally preferred to use cellulosic fibers, such as the natural cellulosic fibers, including cotton, ramie, jute, hemp, and bagasse, and the synthetic cellulosic fibers, such as those formed of regenerated cellulose and cellulose acetate.

Any cellular, hydrophobic sponge material may be used that is sufficiently flexible and resilient for the purpose intended. It is generally preferred to use sponges formed of polyurethane polyethers, polyurethane polyesters, nylon, polyethylene, rubber, polyvinyl chloride and formalinized polyvinyl alcohol, or other materials which will remain resilient and flexible without the need of added plasticizers. However, the invention is not limited thereto and plasticized sponges may be used in practicing the same. In general, particularly where the material is to be used for surgical dressings, the sponge should be readily flexible and conforming in sheets of about 1/32 to 1 inch thickness and should be soft and resilient in nature. The material should be sufficiently flexible and conforming to fit over body contours and be sufficiently soft and resilient to act as a protective cushion without irritation, as would a stiff sponge structure. Accordingly, it is generally desired that the sponge material, where the products of the present invention are to be used in dressings, have a flexibility of 17–74 percent of original thickness and a resiliency of 78–98 percent of original thickness. The flexibility and resiliency are measured in the following manner: The original thickness is measured with a micrometer having a dead weight of 56.7 grams per square inch of sample. A 500 gram weight is added, and the thickness is read after 60 seconds to find flexibility. The 500 gram weight is removed and after 60 seconds the thickness is read to find resiliency. Results are expressed in terms of percentage of original thickness.

Although the present invention is not limited to the use of sponge materials that have an open cellular structure, and sponge materials having closed cellular structures may be employed, it is generally preferred, particularly where the flexible absorbent materials of the present invention are to be used in contact with the body, that the cellular sponge material used have sufficient open cells that the same will not restrict the passage of air therethrough. Where the sponge material has such open and connecting cellular structure, air can readily reach the surface of a wound where the material is used as a dressing so as to help in the healing of the same. This is particularly important where the fibers which penetrate down into the sponge material do not pass all the way through the sponge material.

The absorbent materials of the present invention may be used directly as wound dressing materials or they may be incorporated into dressing structures which take advantage of their excellent cushioning and absorbing characteristics.

In order to further illustrate the invention, reference is made to the drawings wherein are set forth by way of illustration and example, certain embodiments thereof.

Referring to the drawings:

FIG. 1 is a perspective view of an absorbent sheet of the present invention with portions of the fiber layers broken away;

FIG. 2 is an enlarged view taken along line 2—2 of FIG. 1;

FIG. 3 is a perspective view illustrating one manner of using the absorbent sheet of FIGS. 1 and 2 as a dressing;

FIG. 4 is a perspective view of another manner of using the absorbent sheet of FIGS. 1 and 2 as a dressing;

Figure 5:
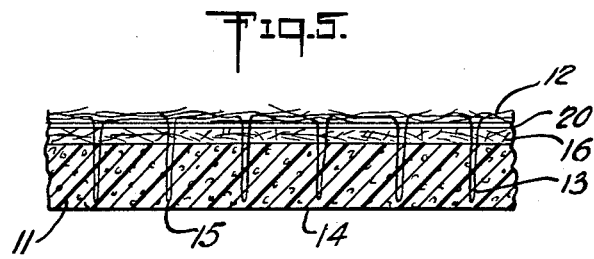
FIG. 5 is a cross-sectional view of a different form of absorbent sheet of the present invention.

Referring to FIG. 1, the absorbent sheet 10 is a composite laminate in which 11 is a flexible sheet of cellular sponge material and 12 is a web of relatively long hydrophilic fibers, such, for example, as cotton or rayon textile fibers. Some of the fibers of the fiber web 12 have been forced down through the sheet 11 of sponge material. These fibers or fiber bundles 13 extend through the sponge sheet 11 and extend slightly through the opposite surface as illustrated at 15. Between fiber web 12 of relatively long fibers and the spong sheet 11 is a second absorbent layer 16. This second absorbent layer 16 may be formed of any highly absorbent material which is of such size or of such consistency that the same cannot satisfactorily be contained on the surface of the absorbent product. In the preferred practice of the present invention, this second absorbent layer is formed of relatively short fibers, the majority of which have a fiber length of less than about 1/4 inch and generally range in length for the major portion of the fibers of from about 1/100 to about 1/8 inch. These fibers may be present either in the form of free fibers or in the form of an absorbent paper, such, for example, as cellulose wadding or both. The fibers used in forming the fiber web 12 preferably have a fiber length of about 1 inch to 3 inches and a denier of about 1 to 10. The fibers of web 12 are pushed down into the sponge sheet 11 through the use of needles containing barbs thereon which catch the fibers and force the same down through the absorbent layer 16 and the sponge sheet in somewhat of a U configuration, as best illustrated in FIG. 2. In forming the product of FIGS. 1 and 2, it is generally preferred that there be at least about 50 needle penetrations per inch. The downwardly extending fibers 13 not only serve to lock the fiber webs onto the sponge sheet 11 but also act to draw fluid into the sponge body so as to fill adjacent sponge cells. Where absorbent layer 16 is made up of absorbent short fibers or other material that may readily come loose from the absorbent sheet product, this layer 16 is preferably terminated, as illustrated at 17, a short distance from the edge of the sponge sheet 11 and the web of long fibers extends on beyond the edge 17 of the absorbent layer 16 and is bonded directly to the sponge sheet so as to completely enclose the absorbent layer 16. The edges of the dressing may also be sealed, as, for example, by the application of heat and pressure, where the sponge sheet 11 is formed of thermoplastic material. In such case it would not be necessary to terminate the edge of layer 16 of short fibers within the edge of the sponge or dressing, as the heat sealing at the edge of the dressing would prevent the escape of fibers.

With an absorbent sheet structure, such as illustrated in FIGS. 1 and 2, when the side 14 opposed to the side which carries the fiber web 12 is contacted by an aqueous base fluid, the protruding ends 15 of the fiber bundles 13 are wetted by the fluid and the fibers 13 draw the fluid into the sponge sheet even though the sponge material itself is hydrophilic in nature. In passing through the sponge sheet, some of the liquid flows into the adjacent cells as previously indicated, while other liquid is conducted completely through the sponge sheet and absorbed in the fiber layer 12 and absorbent layer 16.

FIG. 3 illustrates one manner in which the absorbent fabric of FIG. 1 may be used as a dressing. In FIG. 3, the absorbent fabric of FIG. 1 is shown as placed on the leg 18 of a patient with the surface 14 against the wound and the leg and the absorbent web 12 of relatively long fibers on the surface not in contact with the patient. The dressing is held in place by adhesive strips 19. When used in this manner, body exudate, such as perspiration and secretions from the wound, are rapidly drawn by the fiber ends 15 and fibers 13 up into the body of the sponge 11 and into the absorbent layer 16 and absorbent web 12.

As fluids are rapidly drawn into the sponge sheet away from the surface of the skin and as air can pass through the dressing, both by way of the fibers 13 and because of the porous nature of the sponge material itself, where such material is used, the skin under the dressing is kept relatively dry, and, at the same time, the dressing itself in contact with the skin feels relatively dry as compared with the conventional gauze bandages where the whole undersurface of the dressing becomes wetted and soggy.

There are times, however, when a wet dressing is desirable, for example, as where it is desired to keep a particular medicament in contact with the wound. Where such is the case, the absorbent material of FIGS. 1 and 2 is used on the wound with the fiber web surface 12 impregnated with the medicament and in contact with the wound and skin as illustrated in FIG. 4. Further medication can be applied by wetting the upper surface of the dressing. The fiber 13 will draw such medication down through the sponge layer 11 and spread the same laterally through the fiber web 12 which is in contact with the patient's body.

In FIGS. 1 and 2, when needling the fibers of the web 12 down into the sponge, the fibers are pushed down into the sponge sheet and a portion thereof are forced completely through the sponge. However, for certain uses this may not be desirable. This is particularly true where it is desired that one surface of the absorbent sheet material be absorbent so as to remove fluids from the surface while the other surface be water-repellent so as to prevent water passing through the same. Referring to FIG. 5, a further embodiment of the present invention is illustrated in which the fibers 13 from the fiber web 12 are not forced completely through the sponge sheet 11 but extend only partway down into the sponge sheet terminating short of the surface 14. With this particular structure, the sponge material used should preferably have sufficient open cells to permit the ready passage of air therethrough to prevent masceration of the underlying skin when used as a dressing. The absorbent layer 16, as in the previous description, is maintained between the web 12 of relatively long fibers and the surface of the sponge sheet 11. In the particular construction illustrated in FIG. 5, however, there is also included a layer of cellulose wadding, a highly absorbent paper, between the fiber web 12 and the fiber web 16. When sheet materials of this type are used and the fiber web 12 is brought into contact with a surface containing fluids, the fluids will be absorbed by the fiber web 12, the cellulose wadding 20, and the fiber web 16. However, some of the fluid will also pass on up into the sponge sheet 11 by means of the fibers 13 and be deposited into the adjacent sponge cells, this further increasing the absorbent capacity of the product. As these fibers 13 do not extend completely through the sponge sheet 11, any moisture contacting the other side 14 of the sponge sheet will not enter the same because of the hydrophobic nature of the sponge material. As air can readily pass through the cellular sponge 11, moisture can pass from the penetrating fibers 13 in the form of water vapor on out through the surface 14, thus removing moisture from the surface with which the fiber web 12 is brought in contact. Absorbent sheet material of this type is suitable for bandaging or other use where it is desired that the dressing be substantially water-impermeable from the outside and at the same time absorb fluids from the covered area.

Figure 6:
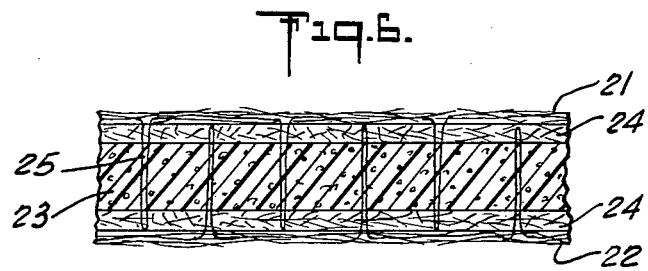
FIG. 6 is a cross-sectional view of still another form of absorbent sheet of the present invention.

In the embodiment illustrated in FIG. 6, fiber webs 21 and 22 formed of carded textile fibers are secured to each side of a sheet of synthetic cellular sponge material 23. Between each of these webs and the surface of the sponge sheet is an absorbent layer 24 formed of cotton linters. Fibers 25 from webs 21 and 22 extend down into the sponge sheet 23 acting to bond the fiber webs to the sponge sheet and conduct fluids into the same. In the embodiment illustrated, these fibers 25 extend on through the sponge and contact the web of fibers on the other side. An absorbent sheet of this type, besides its cush-joining effect, has a substantially greater fluid capacity than a structure of the type illustrated in FIGS. 1 through 5 because of the added webs of absorbent fibers.

Figure 7:
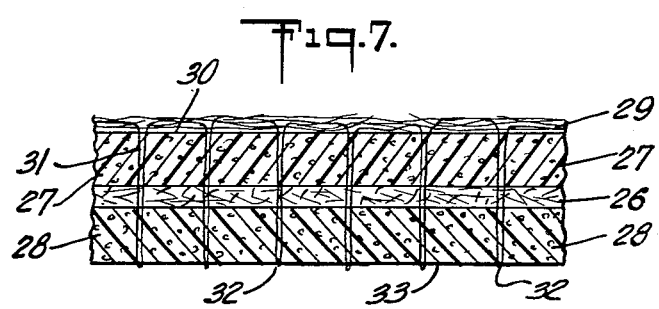
FIG. 7 is a cross-sectional view of still another form of absorbent sheet of the present invention.

In the modification illustrated in FIG. 7, an absorbent layer 26 formed of diatomaceous earth is contained between two sheets 27 and 28 of flexible cellular sponge material. A web 29 of carded hydrophilic textile fibers is secured to the outer surface 30 of sponge sheet 27 by fiber bundles 31 which extend completely through the composite structure so that their ends 32 are wetted by water contacting the outer surface 33 of cellular sponge sheet 28. Any aqueous-base fluid contacting the surface 33 is drawn up through the composite structure into the absorbent layer 26 and the web 29 of hydrophilic fibers. The modification of FIG. 7 may be prepared by first placing the absorbent layer 26 on the surface of sponge sheet 28. Sponge sheet 27 is then placed over the absorbent layer 26 and a web of carded fibers then placed on the outer surface of the sponge sheet 27. The whole structure is then needled, as previously described, the barbed needles passing through the fiber web 29 and forcing fibers down through the structure. Although the absorbent layer 26 is shown as formed of diatomaceous earth, other absorbent materials may be used including the short fibers heretofore referred to and gelatin, charcoal, attapulgus clay, kaolin, or other absorptive material.

Figure 8:
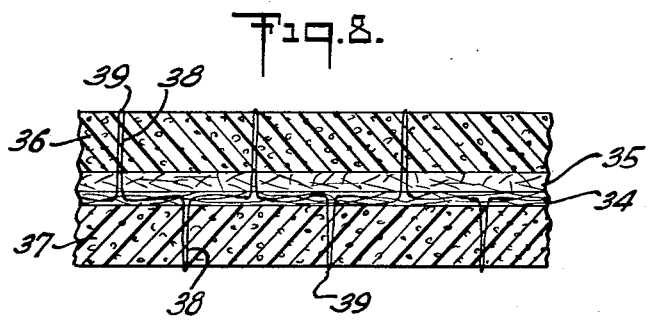
FIG. 8 is a cross-sectional view of still another form of absorbent sheet of the present invention.

In the modification illustrated in FIG. 8, an absorbent web 34 of hydrophilic textile fibers and an absorbent web 35 of cotton linters is contained between two cellular sponge sheets 36 and 37. Fibers 38 extending from the fiber web 34 extend through each of the cellular sponge sheets 36 and 37, the ends 39 of the fiber bundles 38 being wettable from the outer surfaces of such sponge sheets. The product is prepared by first arranging the laminates in the order indicated and then needling the product from both sides to force fibers from the fiber web 34 down through the sponge sheets 36 and 37. With both the structures illustrated in FIGS. 7 and 8, the edges of any article so formed are preferably sealed, as by heat and pressure where thermoplastic sponge materials are used, to prevent escape of absorbent material from the absorbent layers 26 and 35 from the edges.

The following specific example with respect to the manufacture of an absorbent product of the type illustrated by FIGS. 1 through 4 will help to further explain the invention. The example, however, is given for the purpose of illustration only and the invention is not limited thereto.

*Example*

A sheet of polyurethane foam is used as the cellular sponge material. This sheet has a thickness of ¼ inch, a flexibility of 71 percent, a resiliency of 98 percent, and a resistance to air flow having a velocity of 24.7 feet per minute of 0.36 inch of water. A web of cotton linters having an average fiber length of 1/16 inch is placed on top of the sheet of polyurethane foam, the fiber web having a weight of 2.86 ounces per square yard. A web of carded rayon fibers having a denier of 3 and a fiber length of 1 9/16 inches is placed on top of the web of cotton linters.

The sheet of polyurethane foam with the fiber webs is passed through a needling machine, each needle having 9 barbs. The needles are made to penetrate the foam sheet and web from the surface containing the web, the barbs on the needles being in such position as to draw fibers down through the sponge sheet, the fibers not extending more than 1/16 inch from the other surface. The needling is carried out to give 144 needle penetrations per square inch.

The product so prepared has a web of cotton linters enclosed between a web of textile length rayon fibers and the sponge sheet with fiber bundles extending from the rayon fiber web which just penetrate the opposite surface of the sponge sheet and act to bond the whole together and draw fluids into the same. The product is flexible, resilient, and highly absorbent.

Red-colored, aqueous-base fluid is placed on the side of the product opposite that containing the web of rayon fibers. The fluid is rapidly drawn up into the sponge sheet and spread through the web of rayon fibers. When the absorbent sheet product is cut through the center and examined, it is seen that fluid is also deposited in many of the cells in the sponge adjacent the rayon fibers which pass therethrough. Although short fibers are used in the construction of part of the product, these fibers are fully contained, their absorbent capabilities being used to the fullest without danger of such short fibers becoming separated from the product.

Although the products of the present invention have been described as primarily used in the preparation of dressing materials, that is, materials adapted to be used in contact with the body for protection and removal of body fluids, the absorbent products have many uses other than as dressing materials, which will be apparent to those reading the present specification. The products of the present invention are accordingly not limited to use for dressing purposes alone. Also, in describing the present invention, certain embodiments have been used, including the presently preferred embodiments, to illustrate the invention and the practice thereof. However, other embodiments and modifications within the spirit of the invention will readily occur to those skilled in the art on reading the same. Although in the specific illustration given, needling was used to form the final sponge product with absorbent fibers extending from the surface thereof down into the sponge sheet, the products of the present invention may be prepared by any other method whereby fibers are placed within a sheet of sponge material so as to extend from a fiber web into the main body of the cellular sponge sheet and act to draw liquid up into the same. The invention is accordingly not to be limited to the specific embodiments illustrated, these embodiments being used for illustration only, but is to be limited only in accordance with the claims appended hereto.

I claim:

1. An absorbent laminate structure comprising an absorbent layer composed primarily of absorbent other than textile-length fibers contained between a web of textile length fibers and a flexible sheet of cellular sponge material, fibers from said web of textile length fibers extending through said absorbent layer and said sheet of cellular sponge material to the opposite surface thereof whereby when the ends of said fibers which extend through to the opposite surface of said cellular sponge sheet are wetted fluid is drawn up into said sponge sheet by said fibers and dispersed in said absorbent layer and in said web of textile length fibers.

2. An absorbent laminate structure of claim 1 in which said absorbent layer is formed of relatively short fibers.

3. An absorbent laminate structure of claim 2 in which said absorbent layer is formed of cellulosic fibers.

4. An absorbent laminate structure of claim 3 in which at least a portion of said short fibers are in the form of absorbent paper sheet.

5. An absorbent laminate structure of claim 4 in which said absorbent paper sheet is adjacent said web of hydrophilic textile length fibers.

6. An absorbent laminate structure of claim 1 in which said absorbent layer is separated from said web of hydrophilic fibers by a second sheet of cellular sponge material.

7. An absorbent laminate structure of claim 6 in which said absorbent layer is formed of relatively short fibers.

8. An absorbent laminate structure of claim 7 in which at least a portion of said short fibers are in the form of absorbent paper sheet.

9. An absorbent laminate structure comprising a first sheet of cellular sponge material, a second sheet of cellular sponge material, an absorbent layer composed primarily of absorbent other than textile-length fibers contained between said first and second sheets of cellular sponge material, a web of textile length fibers and fibers extending from said web of textile length fibers into said absorbent layer and into said first and second sheets of cellular sponge material, said fibers extending through to the opposite side of at least one of said sheets of cellular sponge material and acting to draw fluids into said absorbent layer.

10. An absorbent laminate structure of claim 9 in which said web of textile fibers and said absorbent layer are both contained between said first and second sheets of cellular sponge.

11. An absorbent laminate structure of claim 10 in which said fibers extending from said web of textile fibers extend through only one of said first and second sheets of cellular sponge material.

12. An absorbent laminate structure comprising a first absorbent layer contained between two flexible sheets of cellular sponge material and composed primarily of absorbent other than textile-length fibers, a second absorbent layer composed primarily of textile-length fibers in contact with said first absorbent layer and fibers from said second absorbent layer of textile-length fibers extending through at least one of said sheets of cellular sponge material to the opposite side thereof and acting to draw fluids through said sheet of cellular sponge material to said first and second absorbent layers for absorption therein.

References Cited in the file of this patent

UNITED STATES PATENTS

| | | |
|---|---|---|
| 2,429,486 | Reinhardt | Oct. 21, 1947 |
| 2,811,154 | Scholl | Oct. 29, 1957 |
| 2,905,176 | Davidson | Sept. 22, 1959 |
| 3,043,301 | Plantinga et al. | July 10, 1962 |